US012664979B2

(12) United States Patent
Odame

(10) Patent No.: US 12,664,979 B2
(45) Date of Patent: Jun. 23, 2026

(54) LOW POWER ANALOG CIRCUITRY FOR ARTIFICIAL NEURAL NETWORKS

(71) Applicant: THE TRUSTEES OF DARTMOUTH COLLEGE, Hanover, NH (US)

(72) Inventor: Kofi Odame, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 285 days.

(21) Appl. No.: 18/288,135

(22) PCT Filed: Apr. 26, 2022

(86) PCT No.: PCT/US2022/026416
§ 371 (c)(1),
(2) Date: Oct. 24, 2023

(87) PCT Pub. No.: WO2022/232196
PCT Pub. Date: Nov. 3, 2022

(65) Prior Publication Data
US 2024/0212672 A1 Jun. 27, 2024

Related U.S. Application Data

(60) Provisional application No. 63/179,762, filed on Apr. 26, 2021.

(51) Int. Cl.
*G10L 15/16* (2006.01)
*G06F 17/16* (2006.01)
*G10L 15/08* (2006.01)
*G10L 25/18* (2013.01)

(52) U.S. Cl.
CPC .............. *G10L 15/16* (2013.01); *G06F 17/16* (2013.01); *G10L 25/18* (2013.01); *G10L 2015/088* (2013.01)

(58) Field of Classification Search
CPC ... G10L 15/16; G10L 25/18; G10L 2015/088; G06F 17/16
See application file for complete search history.

(56) References Cited

U.S. PATENT DOCUMENTS 5,323,467 A * 6/1994 Hermes ................ G10L 21/0208
381/94.3
7,937,155 B1 * 5/2011 Voelkel .............. A61N 1/36038
607/56

(Continued)

FOREIGN PATENT DOCUMENTS

WO WO 2016/053822 A1 4/2016

OTHER PUBLICATIONS

Wang, HitNet: Hybrid Ternary Recurrent Neural Network, 2018, IEEE, whole document (Year: 2018).*

(Continued)

*Primary Examiner* — Sonia L Gay
(74) *Attorney, Agent, or Firm* — Cozen O'Connor

(57) ABSTRACT

A low power analog Long Short-Term Memory (LSTM) recurrent neural network has an input layer, an array of Adaptive Filter Unit for Analog LSTM, a linear projection layer, and an output layer. The output layer has multiple nonlinear amplifiers, a nonlinear element with a sigmoidal input-output characteristic function, and a time-constant adjustable, nonlinear, low pass filter that provides the memory function of the LSTM. The LSTM memory is used with mismatch-robust weights determined by learning by computation of optimal weights values, wherein the objective function minimizes misdetection probability, and used to process a signal to detect events.

20 Claims, 9 Drawing Sheets

(56)                References Cited

U.S. PATENT DOCUMENTS

| | | | |
|---|---|---|---|
| 10,977,547 B2 | 4/2021 | Kaiser et al. | |
| 2004/0165478 A1 * | 8/2004 | Harmon, Jr. ........... | G01V 1/003 |
| | | | 367/87 |
| 2014/0046885 A1 | 2/2014 | Majumdar et al. | |
| 2016/0322055 A1 | 11/2016 | Sainath et al. | |
| 2018/0025721 A1 * | 1/2018 | Li ............................ | G06N 3/09 |
| | | | 704/232 |
| 2020/0065660 A1 * | 2/2020 | Tran ..................... | G06N 3/0442 |
| 2021/0303992 A1 * | 9/2021 | Brothers, III .......... | G06N 3/045 |

OTHER PUBLICATIONS

Yousefi, Block-Based High Performance CNN Architectures for Frame-Level Overlapping Speech Detection, 2020, IEEE, whole document (Year: 2020).*

Masuko, Computational Cost Reduction of Long Short Term Memory Based on Simultaneous Compression of Input and Hidden state, 2017, IEEE, whole document (Year: 2017).*

International Patent Application No. PCT/US22/26416 International Search Report and Written Opinion dated Sep. 8, 2022, 18 pages.

Sak et al., "Long Short-Term Memory Recurrent Neural Network Architectures for Large Vocabulary Speech Recognition", Interspeech, 2014, pp. 338-342.

Beegum, "Speaker Identification with Whispered Speech" . International Journal of Advanced Research in Computer and Communication Engineering, Jun. 2016; vol. 5, Issue 6, 8 pages.

Kihas et al., "Adaptive Filtering Based On Recurrent Neural Networks", Journal of Automatic Control, University of Belgrade, vol. 13(1), 2003; pp. 13-24.

* cited by examiner original GRU
dynamical system topologically-
equivalent system

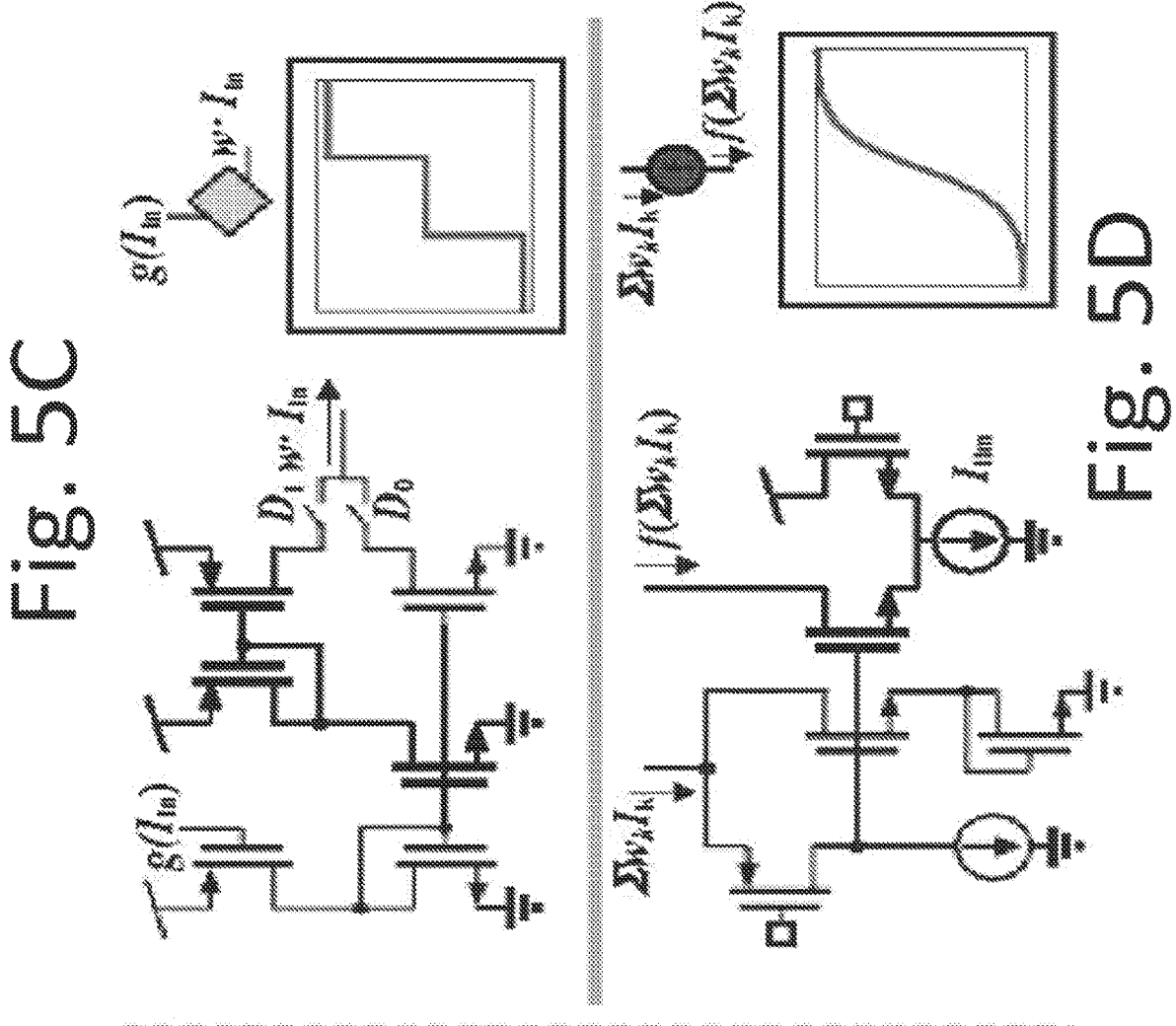

LOW POWER ANALOG CIRCUITRY FOR ARTIFICIAL NEURAL NETWORKS

CLAIM TO PRIORITY

The present document claims priority to U.S. Provisional Patent Application 63/179,762 filed 26 Apr. 2021. The entire contents of the aforementioned provisional application are incorporated herein by reference.

BACKGROUND

There are many applications for devices in body-area networks and internet-of-things (IOT) devices where both very low power consumption and accurate classification of received input data is desirable. Consider as an example, "biostamp" sensing devices that may be glued to skin of a subject and are configured to be always-on to sense physiological parameters of the subject, classify them, and transmit classification results to a body area network host device: biostamp devices have little room for batteries and must be able to operate for days between recharges so power budgets are quite small—in BioStamp® (trademark of Medidata, New York, NY, subsidiary of Dassault Systems, Vélizy-villacoublay, France) or equivalent devices intended for wearing for a week or more between recharges, the power budget may be on the order of microwatts. Another example is security cameras and other always-on sensors that may be embedded into devices like cars and safes that may need to sound alarms or report through IoT devices when classified sensor data indicates a particular event.

There are several known types of trainable classifiers used for artificial intelligence (AI) that can classify events such as those detected by always-on sensors, among these are electronic neural networks. Typically, electronic neural networks contain one or more layers of simulated "neurons", where each "neuron" operates by performing a series of multiply-accumulate (MAC) operations, evaluating: $\Sigma_{i=1}^n p_i \text{input}_i$ for parameters, or weights, $p_i$ that may be positive or negative, the summation is often followed by comparing the summed total to a threshold and/or limits to determine an output. Deep or multilayer neural networks may have several layers of "neurons," where the outputs of neurons for each of the layers become inputs to the next layer: outputs of a final layer become outputs of the neural network.

In biostamp and IoT applications, a "long short-term memory" (LSTM), deep, neural network may serve for real-time classification of sensor data.

Many neural network integrated circuits operate by passing sensor data through an analog front end (AFE) and an analog-to-digital converter (ADC) before performing the MAC operations and thresholding operations in a digital processor. These circuits consume considerable power in the ADC and digital processor, in part because sensor data must be sampled at least at twice the maximum frequency of the sensor data.

In some low-power, wearable systems, an energy-harvesting device may supplement energy stored in a battery or ultracapacitor with energy harvested from wearer movements, ambient light, or temperature differences between skin temperature and ambient temperature.

Gated recurrent units (GRU) are a known type of multilayer neural network where some outputs of a layer are also inputs to that same layer, providing that layer with a memory function.

SUMMARY

A low power analog Long Short-Term Memory (LSTM) recurrent neural network has an input layer, an array of analog gated recurrent units (AGRUs), a linear projection layer, and an output layer. The output layer has multiple nonlinear amplifiers, a nonlinear element with a sigmoidal input-output characteristic function, and a time-constant adjustable nonlinear low-pass filter. The LSTM memory is used with mismatch-robust weights determined by learning by computation of optimal weights values, wherein the objective function minimizes misdetection probability, and used to process a signal to detect events.

BRIEF DESCRIPTION OF THE FIGURES

FIG. 5C is a schematic diagram illustrating circuitry for ternarized weight multiplication for an analog vector matrix multiplier (VMM).

FIG. 5D is a schematic diagram illustrating a sigmoidal functional block that serves as (F) functions in the AGRU.

DETAILED DESCRIPTION OF THE EMBODIMENTS

To avoid needing a power-consumptive AFE or ADC, we believe a deep neural network may operate directly on the sensor's output in the analog domain. Analog spiking neural networks like the Neurogrid, are an appealing option: even though they were not originally designed for the perceptron-type "artificial" neural networks (ANNs) that are used for deep learning, they can implement deep neural networks, either by converting a trained deep ANN into a spiking neural network (SNN), or by building a deep SNN and then training it with a variant of backpropagation. Unfortunately, SNNs can only process data encoded as a train of spikes. Converting a conventional sensor output into this format requires a spike train generator, which, in an audio application, would consume most or all of the power budget in ultra-low power devices.

Non-spiking analog neural networks are typically built around a vector-matrix multiplier (VMM) core. This is a crossbar switch matrix that uses the fundamental analog circuit phenomena of Ohm's law and Kirchhoff's current law to implement the multiply-accumulate (MAC) operation with spectacular efficiency. VMM-based analog deep neural networks have been designed, built and tested on simple image classification tasks. Also, analog recurrent neural networks were tested on trajectory following problems. The results have been promising, although LSTM recurrent neural networks have not previously been demonstrated in analog hardware.

System

Figures 1, 3, 6A:
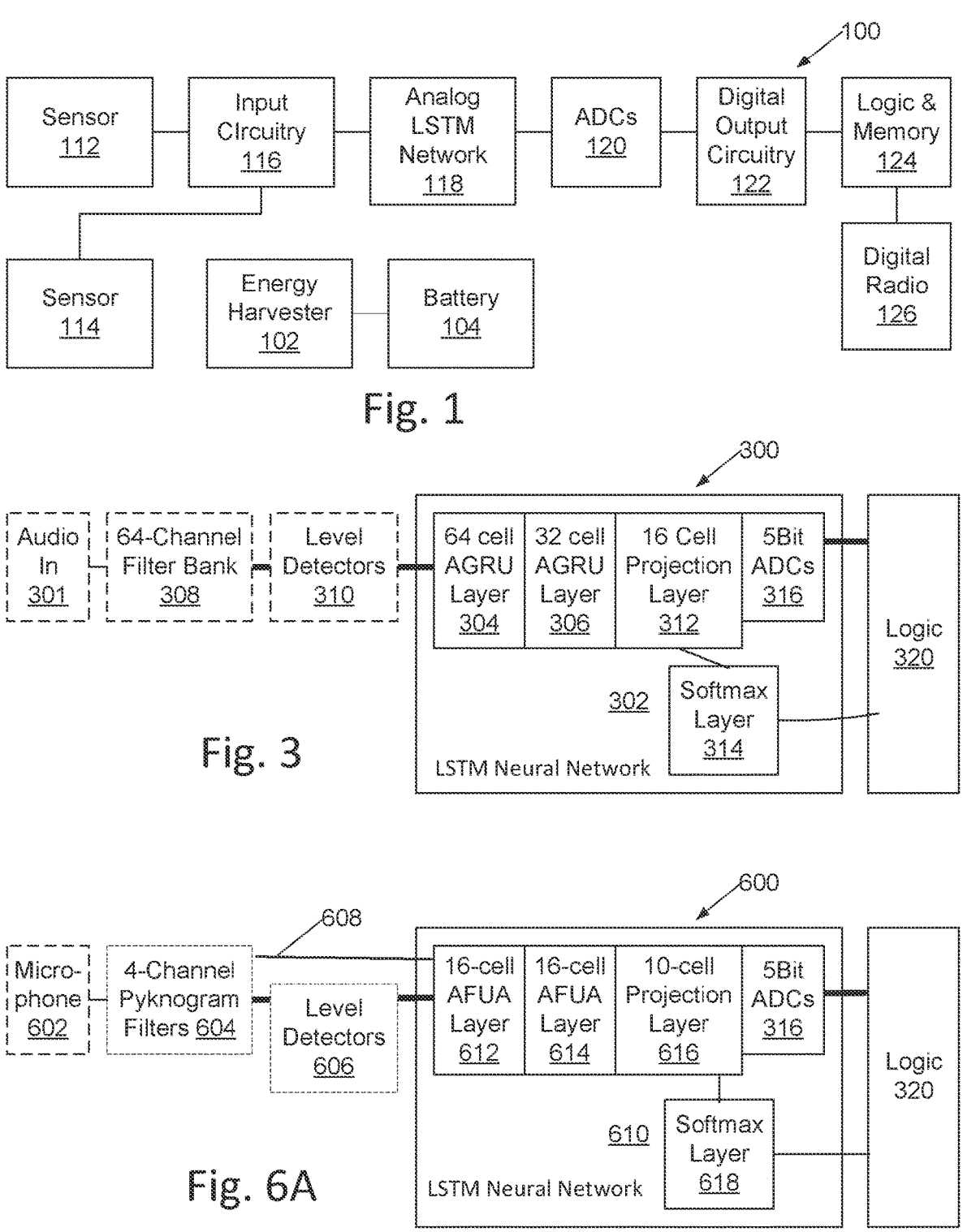
FIG. 1 is a block diagram of a sensor system incorporating a battery with an optional energy-harvesting device, sensors, input circuitry, an LSTM artificial neural network, ADCs, digital output circuitry, micropower logic, and a low-power digital radio configured for reporting classified events to a host device.
FIG. 3 is a block diagram of the analog LSTM artificial neural network, with an optional filterbank configured such that the LSTM artificial neural network can analyze sounds received by a microphone.
FIG. 6A is a block diagram of an alternative analog LSTM neural network with pyknogram filters and Adaptive Filter Unit for Analog LSTM (AFUA) neuron cells adapted for spoken keyword recognition.

An example biostamp-type wearable device 100 is illustrated in FIG. 1. The sensor system incorporates an optional energy-harvesting device 102 coupled to charge a battery 104 that in turn powers the device, at least one sensor 112, 114 such as accelerometers, microphones, temperature sensors, gyroscopic sensors, moisture sensors, and other sensors for biologically significant parameters, input circuitry 116 adapted to process sensor outputs and prepare them for admission to an LSTM artificial neural network 118, ADC's 120, and digital output circuitry 122, micropower logic which may in some embodiments include a low-power processor and memory 124, and a low-power digital radio 126 configured for reporting classified events to a host device (not shown) for further processing. In a particular embodiment where at least one sensor 112 is a microphone, input circuitry 116 includes a bank of 64 low-power analog bandpass filters each feeding a level detector, with the level detector outputs feeding inputs of the LSTM artificial neural network 118.

Analog LSTM

Our available power budget is quite low, particularly when using an LSTM neural network in a biostamp application. To minimize physical obtrusiveness, it must be the approximate size and weight of a band-aid. To minimize disruption of the users' daily behaviors, it should not require battery changes or battery charging for several weeks. These requirements taken together mean that the device must rely on energy harvesting, which can reliably provide 1 µW or less of power.

In an embodiment 300 (FIG. 3), our LSTM neural network 302 incorporates a ternarized-weight neural network 302 with a 64-dimensional input feature of filterbank energies provided by a filter bank 308 and envelope detector 310, followed by two unidirectional analog GRU (AGRU) layers 304, 306 of 64 and 32 units, respectively. Filter bank 308 receives an audio input 301, typically from a microphone, and, with the envelope detector 310, performs spectral analysis of the audio input: the spectrally analyzed output of the envelope detector 310 is fed to the first AGRU layer 304. Most embodiments use low-resolution weights: in this embodiment, three weights of −1, 0, and +1 are used in the AGRU layers of the neural network. In an alternative five-level-weight embodiment, weights of −1.0, −0.5, 0.0, +0.5, and +1.0 are used. In yet other embodiments, weights may have 7 levels, or another low-resolution set of possible weights.

After the two AGRU layers 304, 306, the next layer of the neural network is a 16-unit linear projection layer 312 for dimensionality reduction. The final output layer 314 is a softmax function. To provide input to a downstream automatic speech recognition (ASR) engine, when an event is detected the projection layer 312, the event is optionally digitized with an array of logarithmic 5-bit ADCs 316 for further speech processing. The digitized outputs of the ADCs and output of the output layer 314 are fed to a logic unit 320 that may incorporate a microprocessor, and which may have been held idle until the event was detected. This data representation eases energy requirements of the ADCs that are powered only when an event is detected by the LSTM network, while maintaining high ASR accuracy in processing subsequent voice commands or sounds of medical interest such as coughs and wheezes. The preamplifier consumes 500 nW. The analog LSTM consumes 2 µW (assuming 0.1 pJ/computation). Digitization is achieved with slow (50 Sa/s), low resolution, successive approximation (SAR) ADCs, which consume less than 1 nW (assuming a conservative 20 fJ/step).

To implement a state-of-the-art LSTM for cough or wheeze detection using a microphone as a sensor, or a similar event detection problem, the hardware must execute an equivalent about 85 million vector-matrix multiplications and over 70 thousand Hadamard product multiplications per second. Conventional analog VMMs require about 0.1 pJ per computation, while the element-wise multiplications of a Hadamard product consumes two to seven pJ per computation.

Analog Mismatch

Two nominally-identical analog functional blocks will inherently be mismatched, due to nonidealities in the semiconductor fabrication process. Reducing mismatch ultimately results in increased power consumption, which defeats the purpose of implementing an analog LSTM in the first place. Theoretically, a neural network could incorporate analog nonidealities into its learned model, but there are some practical challenges. Backpropagation, the most widely-used learning algorithm for neural networks, relies on accurate information about the gradients of the network's activation functions. With mismatch, each of these gradients would have to be measured empirically, rather than calculated analytically.

To overcome this, characterization tests and parameter extraction is performed for every manufactured chip, on each instance of each activation function in the neural network. The derivative of each individual measured function is used in a standard backpropagation procedure for stochastic gradient descent. The customized learned weights are then programmed onto the chip under test.

We can avoid having to fully characterize each individual chip by training them via error descent. Generally, the idea is to apply a random test change to the network weights of a fabricated chip, and then observe how its output responds. This gives a crude measure of the error gradient, against which the weights can be updated. With many iterations of this process, the weights will converge, but only slowly (between O(P) and O(P1/2) per epoch, where P is the number of network parameters). The scheme is therefore unsuitable for training large numbers of systems on the large datasets that are used in LSTM networks.

Innovative Nonlinear Dynamical Approach

We will apply the nonlinear dynamical systems approach to implement the LSTM network. When others have considered the design of analog neural networks, it usually involves implementing (or approximating) each discrete mathematical operation with a suitable analog circuit component (e.g. transconductance elements, Gilbert cell multipliers, PWL nonlinear devices from diodes and op-amps, etc.). These are reasonable ways of synthesizing nonlinear processors, but they yield comparatively inefficient implementations.

Figure 2:
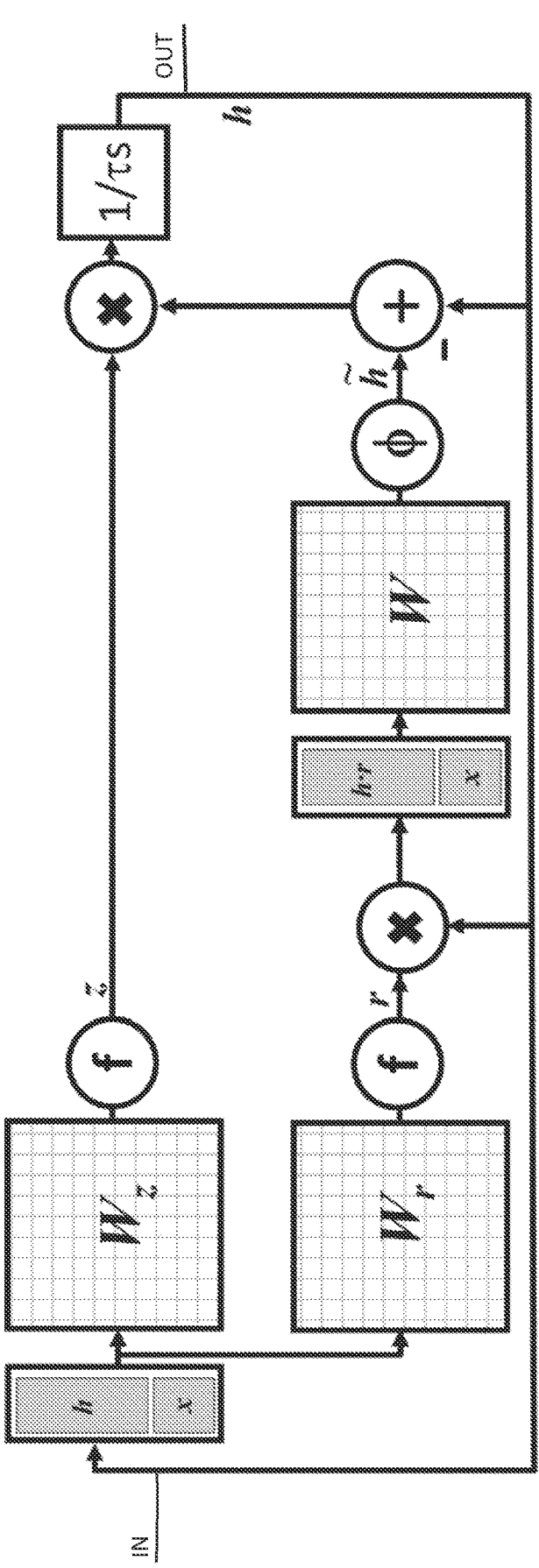
FIG. 2 is a block diagram illustrating how a GRU is modified with a low-pass filter.
Figure 5E:
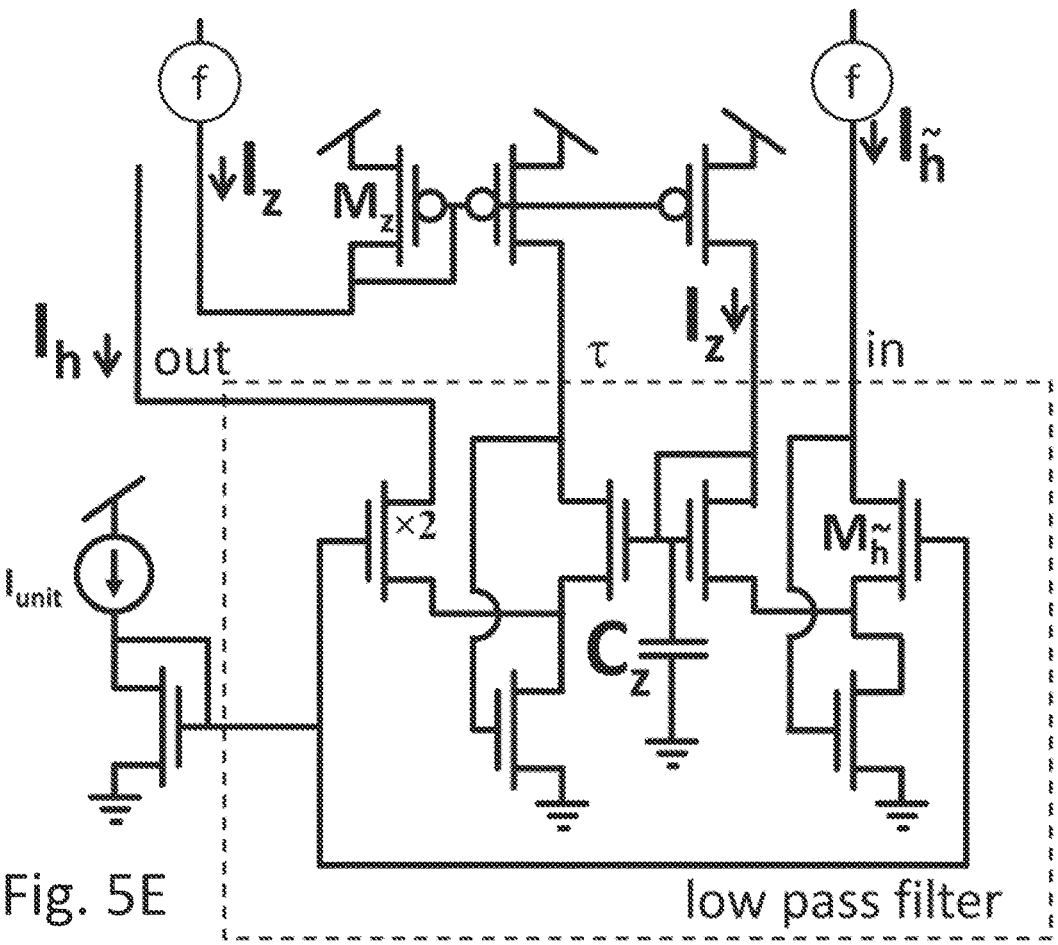
FIG. 5E is a schematic diagram illustrating a nonlinear low pass filter used in the simplified AGRU.

To achieve high functional density and efficiency, the nonlinear dynamical system must be considered as a whole. We can characterize the processing function in nonlinear dynamical system terms. For example, does it have a limit cycle? Does it display hysteresis, or multiple steady-state behavior? Once the fundamental dynamics have been identified, we can then create a circuit that also displays these properties and that is topologically equivalent to the original dynamical system. A type of LSTM called the gated recurrent unit (GRU) is illustrated in FIGS. 2 and 5F. It exhibits a saddle-node bifurcation into a stable and unstable operation areas, and it also has an input-dependent characteristic time scale (analogous to the time constant in a linear time invariant system) via the 'z' signal. As we show in the preliminary results section, careful consideration of these and other properties results in an efficient circuit realization that does not require explicit implementation of every discrete mathematical operation in the GRU state update equation.

In addition to the system-level approach to efficiency, we also propose component-level changes to increase efficiency. In particular, we propose a novel VMM that is roughly 30 times more power-efficient than the state-of-the-art. The essential idea is to reduce the impedance of the VMM's internal nodes by terminating the VMM's accumulation line with a gm-boosted diode-connected transistor. Gm-boosting increases the transconductance (reduces the impedance) of the transistor by the factor of the loop gain. This reduction in impedance pushes parasitic poles to higher frequencies, allowing the VMM to maintain its operation speeds with lower power consumption.

Training with Perturbed Networks

A way to reduce the detrimental effects of noise or mismatch in a neural network is to average the predictions of a large number of these nonideal networks. This idea was demonstrated by training several weak linear analog classifiers, then presenting them each with test data, and finally combining their predictions via AdaBoost.

Our innovation applies the same general concept, but in a way that is computationally feasible for an LSTM network. The idea is to train a large collection of networks that all share weights, and that are all perturbed versions of the same nominal model. The amount and distribution of network perturbations mirror the process variation and device mismatch that would be observed in actual fabricated analog circuits. Each training example is applied to a different perturbed network, and the updated weights are shared with the next, randomly-selected perturbed network. This allows the weights to converge in a way that is robust to analog circuit mismatch.

The procedure is essentially a variation of training with noise regularization, which has been shown to lead to convergence, and even improved performance, under certain conditions. Where noise regularization typically injects noise onto weights or inputs, our approach also adds noise onto the parameters that define activation functions.

We are systematically injecting noise to model the amount of mismatch that is expected from chip fabrication. We are trying to avoid overfitting not just to the data, but also to any given instance of the fabricated chip, within certain yield targets.

Preliminary Results

We used our nonlinear design methodology to make some initial designs of a simpler GRU variant as illustrated in FIG.

4, where a GRU neuron is simplified to an analog GRU (AGRU) neuron using a low-pass filter to provide the recurrent memory function in each neuron or recurrent unit. It is able to exploit the inherent nonlinearities of analog circuits to achieve an extremely efficient implementation. There are fewer cascaded operations necessary to implement the simpler GRU, so the operations can each run a little slower and still meet latency requirements. This simplification, combined with a more efficient VMM, reduces the power consumption of each GRU layer by a factor of 50 to 100.

The reduction in power consumption does not alter the basic dynamics of the GRU, the simpler GRU exhibits a saddle-node bifurcation and a vector field that are similar to those of the original system.

Figure 4:
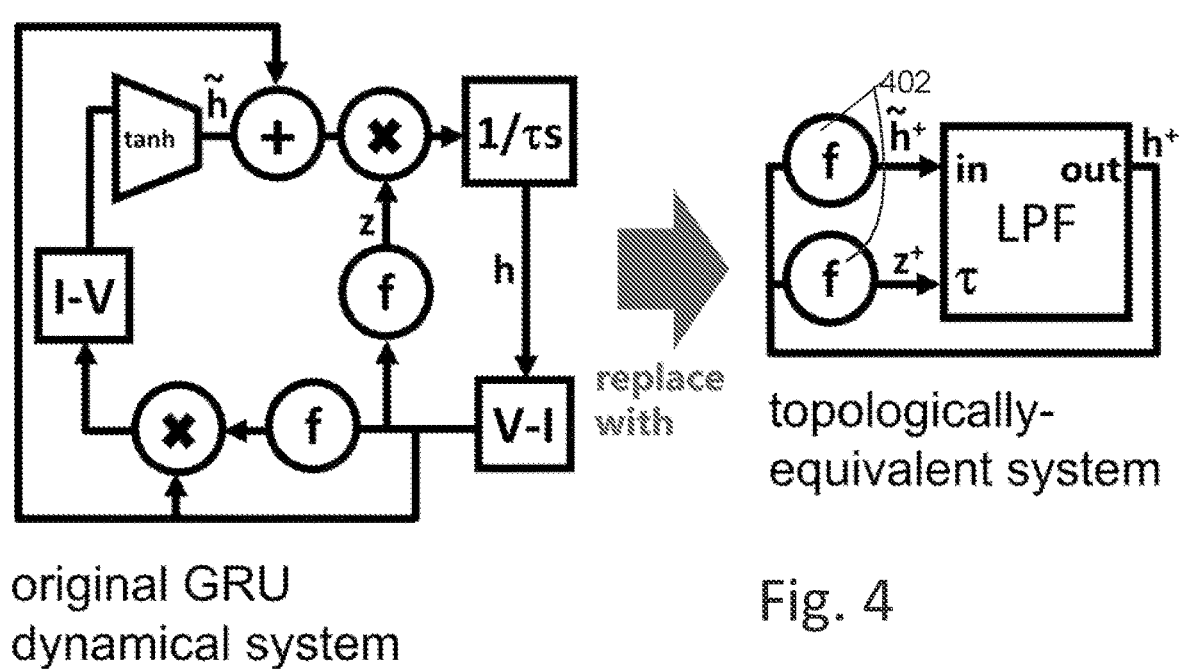
FIG. 4 illustrates simplification of a GRU neuron to an analog GRU (AGRU) neuron using a low-pass filter.

In this simpler, but topologically equivalent system, there are an analog low-pass filter (labeled 'LPF') and a pair of nonlinear activation functions. The original state variables h, ĥ, z are identified with the new state variables h+, ĥ.+, z+, respectively. The block labelled 'LPF' (FIG. 4) is an analog current-mode low-pass filter with a z+-controllable time constant and, in an embodiment, has a schematic illustrated in FIG. 5E. Also, the activation function, $f$ 402, is implemented with a diode-connected transistor and a differential pair. Note: to avoid clutter, the weight matrix multiplications have been omitted in FIGS. 4 and 5A-B and 5D-E.

Mismatch-Robust Training

We applied an early version of our mismatch-robust training scheme to a neural network with sigmoidal and tanh activation functions. Perturbed networks were created by randomly varying the slope and vertical and horizontal offsets of the activation functions. These random variations were sampled from normal distributions with standard deviations of 0.11 and means of 1 (slope) and 0 (offsets). The network was tested on a spoken digits dataset, with 2114 samples for training and 907 samples for validation.

Approach with Analog GRU Network

Our hardware LSTM recurrent neural network is a ternarized-weight (or suitably low-precision weight) neural network with a 64-dimensional input feature of filterbank energies, followed by two unidirectional GRU layers of 64 and 32 units, respectively. The next layer is a 16-unit linear projection layer for dimensionality reduction. The output layer is a softmax function. We plan to do a hyperparameter exploration to improve on this initial model.

Simplified schematics of the major circuit components are shown in FIGS. 5A-5E.

Figure 5A:
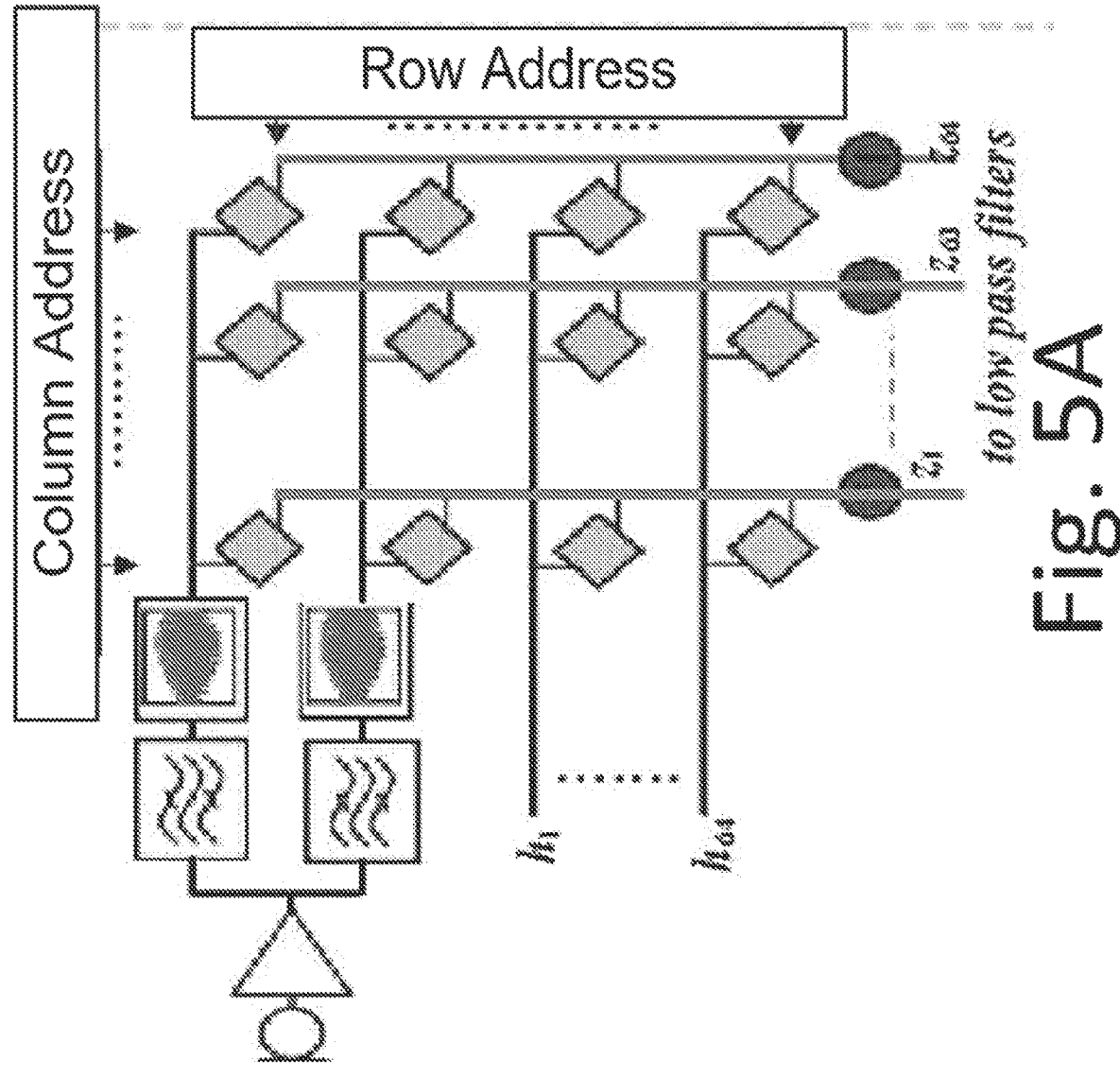
FIG. 5A illustrates a GRU input stage circuit including vector matrix multiplier.

FIG. 5A illustrates a GRU input stage. Bandpass filters and envelope detectors produce filterbank energies, which are multiply-accumulated by ternarized multiply-accumulate blocks 510 (FIG. 5F), illustrated as diamonds in FIG. 5A, and detailed in FIG. 5C, onto column lines as shown in FIG. 5F.

Figure 5B:
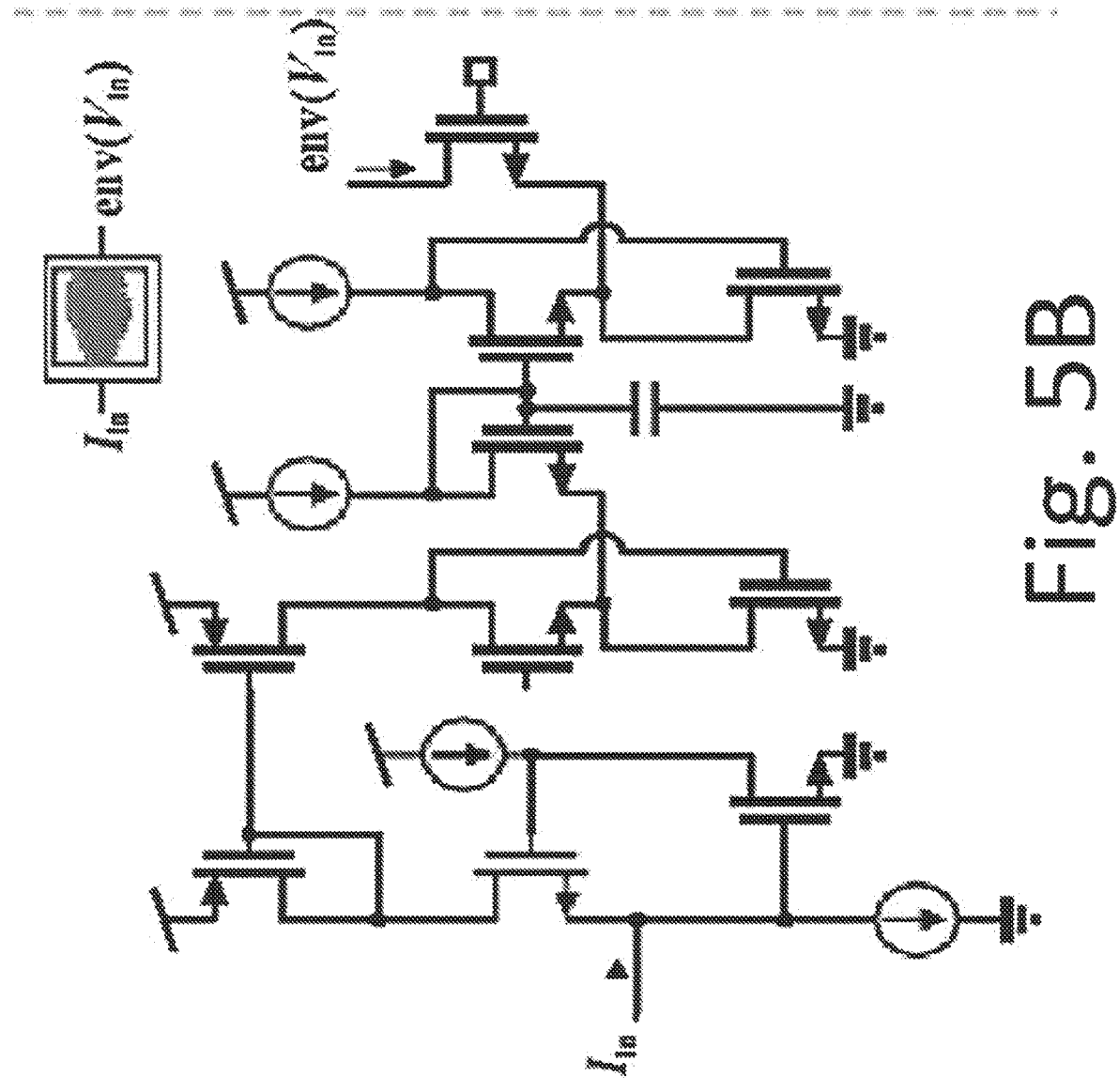
FIG. 5B is a schematic diagram illustrating an envelope detector circuit as used in a GRU.
Figure 5F:
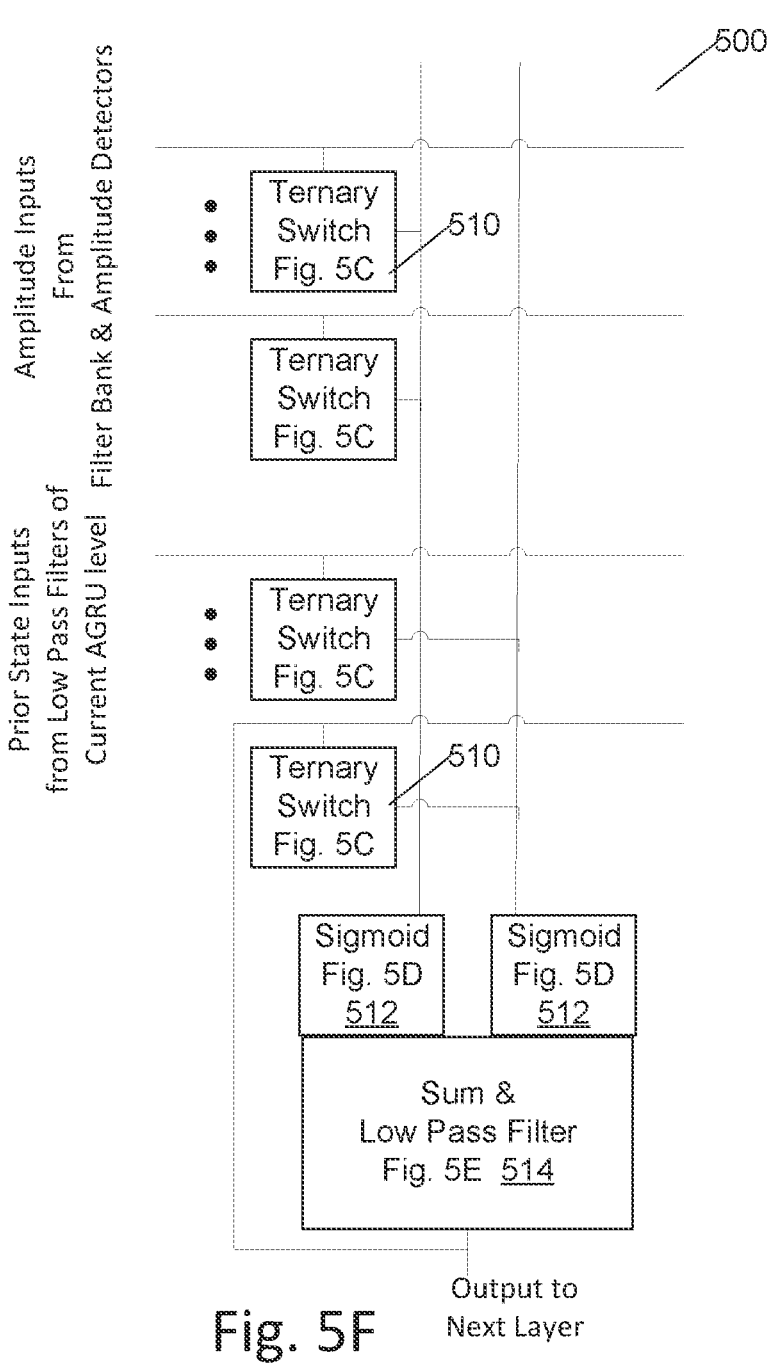
FIG. 5F is a schematic diagram of an AGRU cell illustrating how the blocks of FIGS. 5A, 5C, 5D, and 5E are used.

FIG. 5B illustrates an envelope detector, used to determine filterbank energies from filterbank outputs. The input current, $I_{in}$, is rectified by the diode-connected pMOS and then smoothed with a current-mode, analog, low-pass filter. FIG. 5C illustrates ternarized weight multiplication for an analog VMM. By switching the $D_0$. $D_1$ switches appropriately, $I_{in}$ is multiplied by the weight parameter, one of $\{-1, 0, 1\}$. Also shown in FIG. 5D, is a sigmoidal functional block used for functional blocks 402, 512 (FIG. 5F). The left-most pMOS is a common gate amplifier that provides gm-boosting to the cascoded nMOS pair. The impedance encountered by the $\omega_k I_k$ current is reduced by a factor of the common gate amplifier gain. This pushes the parasitic pole of the VMM accumulation line to high frequencies, allowing the VMM to run with low power consumption. Sigmoidal behavior is derived from a combination of the single-endedness enforced by the nMOS input sink and the output differential pair stage. FIG. 5E details a nonlinear low pass filter 514. The input to the filter is the current corresponding to $h_i$. Also, the normally-fixed "time-constant" current is set by the $z_i$ signal. This effectively acts as a knob that either allows or impedes updating of the state variable, h.

Monte Carlo Backpropagation

Statistical models on device mismatch, such as those provided by a semiconductor foundry, will be used to generate a different perturbed network for each update step of a stochastic gradient descent training scheme. The forward pass will be performed on the perturbed network, using low-precision weights. The backpropagation pass will use full-precision weights, or else a quantized backpropagation method. Also, gradients will be averaged over the set of perturbed networks that are used in a given mini-batch.

The steps of the perturbed network training scheme involve: (1) Monte Carlo analysis—based on statistical parameters that are empirically measured by the semiconductor fabrication foundry—will be performed on the transistor-level description of the neural network's activation functions and other mathematical operators. Monte Carlo simulation samples the device matching and process variations and is a standard tool used in the semiconductor industry to accurately predict the variance and yield of a chip design. This analysis will yield information on the probability distribution of activation functions' parameters (e.g. the slope of rectified linear units (ReLU) as known in the art of neural networks): (2) generating perturbed network models. A new; perturbed network will be generated upon the presentation of each training case. The activation functions of the network will each be perturbed from their nominal parameters, using the probability distributions derived from the previous step. To keep the algorithm computationally tractable, weights will be shared between perturbed networks: (3) Weight programming. The final step of the scheme is to program the learned weights onto a physical integrated circuit realization of the network. Since this is an analog chip implementation, it is in essence just another perturbed network, sampled from the same distribution that was used to learn the programmed weights. Thus, the programmed chip should be automatically compensated against its inherent mismatch and variation.

Speech Recognition with Pyknogram Filter and AFUA

We anticipate that the low-power neural network herein disclosed may prove useful in classifying a wide variety of sensor data, including motion sensor data for discrimination of walking or running from other movements, and in particular may serve as a classifier stage to classify audio that has been preprocessed into frequency domain or otherwise spectrally analyzed by a filter bank or fast-Fourier transform. We expect the low-power neural network to be able to classify preprocessed audio signals of many types, such as dog barks, cat meows, bird songs, human coughs or wheezes, heart murmurs, and speech.

In a particular embodiment 600, illustrated in FIG. 6A we have combined a low-power neural network with a 4-channel pyknogram filterbank 604 to classify speech recorded by a microphone 602. In this embodiment, the pyknogram filterbank 604 and amplitude detectors 606 preprocesses the speech by performing spectral analysis providing frequencies 608 and detected amplitudes to the low power LSTM neural network 610. The low-power LSTM neural network 610 detects and identifies ten spoken keywords with better than 90% accuracy with estimated power consumption of about ¾ microwatt when implemented in a 180 nanometer CMOS process.

Pyknogram Filterbank

Figure 6B:
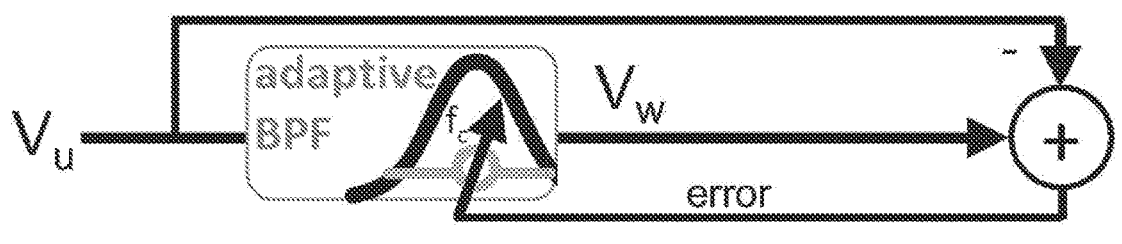
FIG. 6B is a block diagram of a channel of a pyknogram filter used with a microphone and the analog LSTM neural network for spoken keyword recognition.

The pyknogram filterbank 604 produces a dense, low dimensional version of a spectrogram. The pyknogram filterbank 604 has multiple filter channels, in a particular embodiment only 4 channels provided sufficient spectral information for speech recognition. In other embodiments, additional channels may be provided. Each pyknogram filterbank 604 channel has structure illustrated in FIG. 6B. First, a bandlimited signal, Vu, from microphone 602 is input to an adaptive bandpass filter 605 (FIG. 6B). Then, the adaptive filter attempts to minimize an error between its input $V_u$ and its output $V_w$ by adjusting its center frequency, $f_c$: the error is minimized when $f_c$ is tracking the input signal's most energetic frequency region. Thus, the center frequency, $f_c$, is an output "feature" of the pyknogram analysis, as is an amplitude $A_f$. For voice inputs $f_c$ corresponds to the speech formant.

In each channel of the pyknogram filterbank, NMOS $M_x$ is in the subthreshold regime with a drain current, $I_x$, given by $$C_x dI_x/dt = \left(\kappa Gm/UT\right) \cdot (V_u - V_w) \cdot \mathrm{sgn}(V_y) \cdot I_x,$$

where $\kappa$ is the body-effect coefficient and $U_T$ is a thermal voltage. $I_x$ is also the bias current that controls the gain of the transconductance amplifiers, and hence the filter's center frequency. So, the pyknogram filter channel continually adjusts $I_x$—and hence the center frequency—to minimize the $(V_u-V_w)$ error and thereby track the most energetic frequency region in the input speech signal.

Each channel of pyknogram filter is configured to process a particular sub-band of input audio, in an embodiment by feeding audio to each pyknogram filter through an appropriate bandpass filter, and in an alternative embodiment by limiting the range of control current $I_x$.

AGRU→AFUA for Speech

We can simplify a GRU with a simpler set of equations via the following manipulations. The sigmoid function of gives $z_j$ a range of (0, 1), and extrema of this range reveals the basic mechanism of an update equation. For $z_j=0$, the update equation is $h_j^{(t)}=\tilde{h}_j^{(t)}$. For $z_j=1$, the update equation becomes $h_j^{(t)}=h_j^{(t-1)}$. Without loss of generality, we replace $(1-z_j)$ with $z_j$ (this merely inverts the logic of the update gate). So, replacing $(1-z_j)$ and rearranging the update equation and recognizing similarity to a transfer function of a first-order low pass filter with a continuous-time form of:

$$\frac{\tau}{z_j(t)} \frac{dh_j}{dt} + h_j(t) = \bar{h}_j(t)$$

where $\tau=\Delta T$, the time step of the discrete-time system. The gating mechanics of the continuous—versus discrete-time update equations are equivalent, modulo the inverted logic: For $z_j(t)=0$, this amounts to a low-pass filter with an infinitely large time constant, and $h_j(t)$ does not change. For $z_j(t)=1$, this is a low-pass filter with a time constant of $t=\Delta T$. The $\Delta T$ time step is small relative to the GRU's dynamics.

Figure 7:
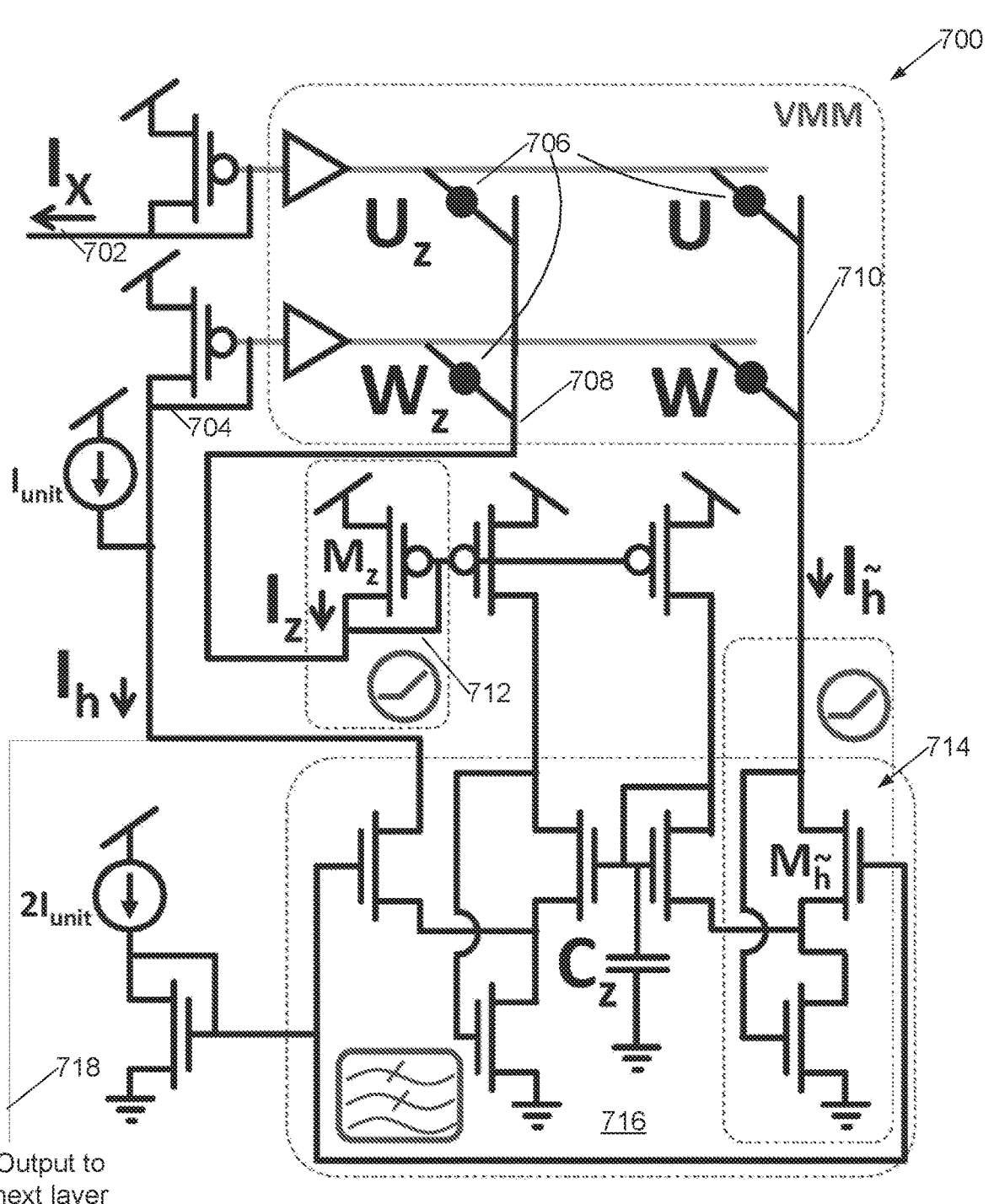
FIG. 7 is a simplified schematic diagram illustrating implementation of an AFUA) implementation of an analog recurrent unit using an analog low-pass filter in the memory path.

Finally, if we translate the origins of both $h_j(t)$ and $\bar{h}_j(t)$ to 1, then we can replace the tanh with a saturating function that has a range of (0, 2). Replacing tanh with min(softplus (·), 2), translating the origin, and discarding the reset gate, we arrive at the Adaptive Filter Unit for Analog LSTM (AFUA) as illustrated in FIG. 7.

Frequency and amplitude outputs of the pyknogram filterbank are fed to a trained low-power neural network as herein disclosed having 2264 ternary weight parameters, the weight parameters having been trained using a database of multiple speakers speaking digits, with 2114 samples for training and 907 samples for validation.

In this embodiment, we use as a recurrent unit an Adaptive Filter Unit for Analog LSTM (AFUA) that implements the equations:

$$z_j(t) = \min\big(\mathrm{soft}\big([Wz_x]_j + [U_z(h(t)-1)]_j\big), 1\big)$$

$$\tilde{h}_j(t) = \min\big(\mathrm{soft}\big([W_x]_j + [U(h(t)-1)]_j\big), 2\big)$$

$$\frac{\tau}{z_j(t)}\frac{dh_j}{dt} = \tilde{h}_j(t) - h_j(t),$$

where we have also replaced the sigmoid with a clipped softplus. The benefit of the softplus over the sigmoidal function is that we can implement it as a diode-connected transistor, which costs minimal area and zero power.

The AFUA is a type of continuous-time GRU. But while the GRU contains 3 Hadamard multiplications, the AFUA contains none. Further, the AFUA has no reset gate.

Finally, as a circuit embodiment of an embodiment of an AFUA illustrated in FIG. 7 shows, the AFUA avoids the overhead of operational amplifiers, current/voltage converters and internal digital/analog converters found in other analog LSTM implementations. Fewer operations and smaller overhead mean less power consumption.

In the embodiment of FIG. 7, drain currents of Mz and M$\tilde{h}$ are $$Iz = \min(\mathrm{soft}([WzIx] + [U_z(Ih - I\text{unit})]), I\text{unit}),$$

$$I\tilde{n} = \min(\mathrm{soft}([WIx] + [U(Ih - I\text{unit})]), 2I\text{unit}).$$

Also, from the translinear loop principle, current Ih is defined by:

$$\frac{C_Z U_T}{k I_{unit}}\frac{I_{unit}}{I_z}\frac{dI_h}{dt} = I_{\tilde{h}} - I_h$$

These equations represent the current-mode representations of the AFUA. When Iz is close to zero, the hidden state (represented by Ih) changes slowly, and the AFUA can retain long-term memory. When Iz is large, the state's rate of change increases, and the AFUA replaces its memory with newly arrived information via I$\tilde{h}$.

In the embodiment of FIG. 7, each AFUA 700 recurrent unit cell has multiple inputs some of which 702 come from either a prior layer or the pyknogram filter, and some of which 704 come from low pass filters of the same or other AFUA recurrent cells of the same layer. Each input is buffered and brought through ternary-weight multiply-accumulate circuitry 706 onto accumulator column lines 708, 710. Each accumulator column line 708, 710 is coupled through a softmax function block 712, 714, implemented with diode-coupled transistors, to an analog low-pass filter 716. Analog low pass filter output is tapped 718 to drive the next layer of the analog LSTM neural network, and to provide delayed feedback into the current layer thereby providing the long-short term memory function.

Results

We evaluated the AFUA against the classical LSTM in a 10-word (spoken digits) keyword spotting task based on the Google Speech Commands dataset. We implemented the following network architecture in Tensorflow: two 16-unit recurrent layers 612, 614, of sixteen AFUA cells (each recurrent layer in alternative embodiments includes multiple AFUA, AGRU, or LSTM cells receiving the layer's inputs-such as inputs to the neural network or outputs of the prior recurrent layer—and outputs of the same layer providing recurrency) followed by a 10-unit linear projection layer 616 with ReLU units, and a 10-unit softmax output layer 618. The train/validation/test data split was 53/17/30. We used the ADAM optimizer, mini-batch sizes of 1024 and trained for 2000 epochs while using ternary weights. This is only an example we experimented with, we expect a wide variety of neural networks with two or more layers of AFUA or AGRU cells should suffice for decoding a repertoire of ten spoken keywords: larger vocabularies may require additional AFUA or AGRU neuron cells, additional projection layer cells, and additional softmax layer cells to accommodate.

The AFUA performs similarly to AGRU and LSTM. The AFUA's advantage is fewer inputs and fewer operations per neuron, the AFUA's computational complexity is up to 100× less than that of other approaches. Also, the AFUA is a smaller model, as illustrated by its parameter count. Finally, the AFUA implemented in a 0.18 μm 1.8 V process with Iunit=0.2 nA would consume 0.76 μW. This power consumption meets the constraints of a self-powered sensor Combinations The features and circuits herein described can be implemented in multiple combinations and variations. Among combinations anticipated by the inventors are:

A low power analog Long Short-Term Memory (LSTM) recurrent neural network signal processing device designated A including input circuitry, and an array, the array including at least one layer of a plurality of recurrent units selected from the group consisting of Adaptive Filter Unit for Analog LSTM (AFUA) and Analog Gated Recurrent Units (AGRU), the array configured to receive input signals from the input circuitry: and a linear projection layer: and an output layer. The recurrent units each include a vector matrix multiplier array (VMM) circuitry configured to sum a plurality of products weights times inputs of the recurrent units.

A low power analog LSTM recurrent neural network signal processing device designated AA including the device designated A, wherein: the input circuitry is configured to couple at least one preprocessed input signal from sensors to the array.

A low power analog LSTM recurrent neural network signal processing device designated AB including the device designated A or AA, wherein the input circuitry includes: a plurality of analog bandpass filters coupled to a plurality of envelope detectors, such that a first end of a plurality of the analog bandpass filters is coupled to an input and a second end of a plurality of the analog bandpass filters is coupled to an input of an envelope detector, and outputs of the plurality of envelope detectors couple to the array.

A low power analog LSTM recurrent neural network signal processing device designated AC including the device designated AB, wherein the envelope detector comprises a rectifier and a current-mode low pass filter, wherein the rectifier is coupled to the current-mode low pass filter.

A low power analog LSTM recurrent neural network signal processing device designated AD including the device designated A, AA, AB, or AC, wherein: the linear projection layer reduces a signal dimensionality of a prior layer of recurrent units by applying an adjustable weight to each output of the prior layer of recurrent units to form weight-adjusted signals, and then summing the weight-adjusted signals.

A low power analog LSTM recurrent neural network signal processing device designated AE including the device designated A, AA, AB, AC, or AD, wherein: the recurrent units of the array each receive a plurality of analog signals and multiply each analog signal by an adjustable low bit-width resolution weight value.

A low power analog LSTM recurrent neural network signal processing device designated AF including the device designated AE, wherein: each low bit-width resolution weight is ternarized to one of {–1, 0, 1}.

A low power analog LSTM recurrent neural network signal processing device designated AF including the device designated A, AA, AB, AC, AE, AF, or AE, wherein: the recurrent units of the array are AGRUs, and the AGRUs further comprise sigmoidal functional blocks and a low pass filter having an adjustable time constant.

A low power analog LSTM recurrent neural network signal processing device designated AG including the device designated A, AA, AB, AC, AD, or AE, wherein the input circuitry comprises a plurality of pyknogram filters.

A low power analog LSTM recurrent neural network signal processing device designated AH including the device designated AG, wherein each pyknogram filter comprises an adaptive bandpass filter having a center frequency, the adaptive bandpass filter configured to track a frequency of a strongest signal within a frequency range.

A low power LSTM recurrent neural network signal processing device designated AJ including the device designated A, AA, AB, AC, AD, AE, AG, or AH \, wherein the recurrent units of the array are AFUAs.

A low power LSTM recurrent neural network signal processing device designated AK including the device designated AJ, where each AFUA recurrent unit cell comprises a ternary-weight multiply-accumulate circuitry coupled through a softmax function to an analog low-pass filter.

A method for detecting events designated B, including: using a method comprising learning mismatch-robust weights learning for a low power analog LSTM recurrent neural network signal processing device incorporating computation of optimal weights values, wherein an objective function is to minimize a misdetection probability: where the LSTM recurrent neural network includes: an array comprising a plurality of Adaptive Filter Unit for Analog LSTM (AFUAs) analog recurrent units, a linear projection layer, and an output layer: and operating the LSTM recurrent neural network with the computed optimal weights values to process a signal to detect the events: and wherein the AFUAs comprise a low pass filter array and a vector matrix multiplier array (VMM) comprising circuitry configured to sum a plurality of products of multiplying weights times inputs of the AFUAs.

A method designated BA including the method designated B, wherein the computed optimal weights values are computed using a multi-iteration Monte Carlo Backpropagation method adapted to minimize effects of component mismatch in the AFUAs.

A method designated BB including the method designated BA, wherein the multi-iteration Monte Carlo Backpropagation method includes: using statistical parameters applied to a transistor-level description of the LSTM neural network's activation functions and mathematical operators to simulate matching and process variations to give a probability dis-tribution of activation function parameters and generating perturbed network models: and perturbing activation functions of the LSTM neural network from the probability distributions of activation function parameters.

A method designated BC including the method designated B, BA, or BB, further including: generating a set of per-turbed networks from statistical models on fundamental device-level mismatch, and iteratively computing activation function parameters for each of the set of perturbed net-works, wherein low-precision weights are used during for-ward pass calculations and full-precision weights are used during backpropagation pass calculations.

A method of detecting spoken keywords designated C including: filtering audio to determine a spectral analysis of an audio signal: and providing the spectral analysis of the audio signal to the method for detecting events designated B, BA, BB, or BC.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A low power analog Long Short-Term Memory (LSTM) recurrent neural network signal processing device comprising:
input circuitry, and
an array, the array comprising at least one layer of a plurality of recurrent units comprising Analog Gated Recurrent Units (AGRUs), the AGRUs further com-prise sigmoidal functional blocks and a low pass filter having an adjustable time constant, the array config-ured to receive input signals from the input circuitry;
a linear projection layer, and
an output layer;
wherein the recurrent units each comprise a vector matrix multiplier array (VMM) comprising circuitry config-ured to sum a plurality of products weights times inputs of the recurrent units.

2. The low power analog LSTM recurrent neural network signal processing device of claim 1, wherein:
the input circuitry is configured to couple at least one preprocessed input signal from sensors to the array.

3. The low power analog LSTM recurrent neural network signal processing device of claim 2, wherein the input circuitry comprises:
a plurality of analog bandpass filters coupled to a plurality of envelope detectors, such that a first end of a plurality of the analog bandpass filters is coupled to an input and a second end of a plurality of the analog bandpass filters is coupled to an input of an envelope detector, and outputs of the plurality of envelope detectors couple to the array.

4. The low power analog LSTM recurrent neural network signal processing device of claim 3, wherein the envelope detector comprises a rectifier and a current-mode low pass filter, wherein the rectifier is coupled to the current-mode low pass filter.

5. The low power analog LSTM recurrent neural network signal processing device of claim 1, wherein: the linear projection layer reduces a signal dimensionality of a prior layer of recurrent units by applying an adjustable weight to each output of the prior layer of recurrent units to form weight-adjusted signals, and then summing the weight-adjusted signals.

6. The low power analog LSTM recurrent neural network signal processing device of claim 1, wherein: the recurrent units of the array each receive a plurality of analog signals and multiply each analog signal by an adjustable low bit-width resolution weight value.

7. The low power analog LSTM recurrent neural network signal processing device of claim 6, wherein:

each low bit-width resolution weight is ternarized to one of {−1, 0, 1}.

8. The low power analog LSTM recurrent neural network of claim 2, wherein the input circuitry comprises a plurality of pyknogram filters.

9. The low power analog LSTM recurrent neural network of claim 8, wherein each pyknogram filter comprises an adaptive bandpass filter having a center frequency, the adaptive bandpass filter configured to track a frequency of a strongest signal within a frequency range.

10. A low power analog Long Short-Term Memory (LSTM) recurrent neural network signal processing device comprising:

input circuitry, and an array, the array comprising at least one layer of a plurality of recurrent units comprising Adaptive Filter Unit for Analog LSTM (AFUA) where each AFUA recurrent unit cell comprises a ternary-weight multiply-accumulate circuitry coupled through a softmax function to an analog low-pass filter, the array configured to receive input signals from the input circuitry;

a linear projection layer, and an output layer;

wherein the recurrent units each comprise a vector matrix multiplier array (VMM) comprising circuitry configured to sum a plurality of products weights times inputs of the recurrent units.

11. A method for detecting events, comprising:

using a method comprising learning mismatch-robust weights learning for a low power analog LSTM recurrent neural network signal processing device comprising: computation of optimal weights values, wherein an objective function is to minimize a misdetection probability;

where the LSTM recurrent neural network comprises: an array comprising a plurality of Adaptive Filter Unit for Analog LSTM (AFUAs) analog recurrent units, a linear projection layer, and an output layer;

and operating the LSTM recurrent neural network with the computed optimal weights values to process a signal to detect the events; and wherein the AFUAs comprise a low pass filter array and a vector matrix multiplier array (VMM) comprising circuitry configured to sum a plurality of products of multiplying weights times inputs of the AFUAs.

12. A method of claim 11, wherein the computed optimal weights values are computed using a multi-iteration Monte Carlo Backpropagation method adapted to minimize effects of component mismatch in the AFUAs.

13. A method of claim 12, wherein the multi-iteration Monte Carlo Backpropagation method comprises:

using statistical parameters applied to a transistor-level description of the LSTM recurrent neural network's activation functions and mathematical operators to simulate matching and process variations to give a probability distribution of activation function parameters and generating perturbed network models; and perturbing activation functions of the LSTM neural network from the probability distributions of activation function parameters.

14. A method of claim 11, further comprising:

generating a set of perturbed networks from statistical models on fundamental device-level mismatch, and iteratively computing activation function parameters for each of the set of perturbed networks, wherein low-precision weights are used during forward pass calculations and full-precision weights are used during back-propagation pass calculations.

15. A method of detecting spoken keywords comprising:

filtering audio to determine a spectral analysis of an audio signal; and providing the spectral analysis of the audio signal to the method for detecting events of claim 11.

16. The low power analog LSTM recurrent neural network signal processing device of claim 10, wherein: the input circuitry is configured to couple at least one preprocessed input signal from sensors to the array.

17. The low power analog LSTM recurrent neural network of claim 16, wherein the input circuitry comprises a plurality of pyknogram filters.

18. The low power analog LSTM recurrent neural network of claim 17, wherein each pyknogram filter comprises an adaptive bandpass filter having a center frequency, the adaptive bandpass filter configured to track a frequency of a strongest signal within a frequency range.

19. The low power analog LSTM recurrent neural network signal processing device of claim 10, wherein the input circuitry comprises:

a plurality of analog bandpass filters coupled to a plurality of envelope detectors, such that a first end of a plurality of the analog bandpass filters is coupled to an input and a second end of a plurality of the analog bandpass filters is coupled to an input of an envelope detector, and outputs of the plurality of envelope detectors couple to the array.

20. The low power analog LSTM recurrent neural network signal processing device of claim 19, wherein the envelope detector comprises a rectifier and a current-mode low pass filter, wherein the rectifier is coupled to the current-mode low pass filter.

* * * * *